United States Patent [19]

Fairchild

[11] Patent Number: 4,679,217
[45] Date of Patent: Jul. 7, 1987

[54] X-RAY CASSETTE STRUCTURE

[75] Inventor: Richard A. Fairchild, Stoughton, Mass.

[73] Assignee: Fairchild Medical Systems, Inc., Stoughton, Mass.

[21] Appl. No.: 721,070

[22] Filed: Apr. 8, 1985

[51] Int. Cl.⁴ .............................................. G03B 42/04
[52] U.S. Cl. ...................................... 378/97; 378/175; 378/188
[58] Field of Search .................. 378/97, 167, 175–176, 378/181–188

[56] References Cited

U.S. PATENT DOCUMENTS

| | | | |
|---|---|---|---|
| 2,993,123 | 7/1961 | Ball | 378/97 |
| 3,942,016 | 3/1976 | Schatz | 378/188 |
| 4,053,774 | 10/1977 | Berdahl | 378/97 |
| 4,104,524 | 8/1978 | Aichinger et al. | 378/97 |
| 4,121,104 | 10/1978 | Richter | 378/182 X |
| 4,230,944 | 10/1980 | Wiegman et al. | 378/97 |
| 4,352,197 | 9/1982 | Waerve | 378/181 X |
| 4,383,330 | 5/1983 | DeFelice et al. | 378/188 X |
| 4,400,821 | 8/1983 | Aichinger et al. | 378/97 |
| 4,455,669 | 6/1984 | Aichinger et al. | 378/97 |
| 4,563,586 | 1/1986 | Jordan | 378/97 |

*Primary Examiner*—Frederick R. Schmidt
*Assistant Examiner*—Steven P. Schad
*Attorney, Agent, or Firm*—Robert F. O'Connell

[57] ABSTRACT

A structure for use in determining the amount of radiation, e.g., X-ray radiation, received at one or more selected regions of an object, which structure includes a housing having front and rear covers and an image producing component, e.g., an X-ray film and one or more scintillating screens associated therewith positioned within the housing in alignment with such one or more regions. One or more detector arrays are fixedly positioned with respect to the housing in alignment with the image producing component and the one or more detector arrays respond to the one or more images produced to provide one or more output signals the values of which can be used to determine the amount of radiation received by the selected regions of the object.

20 Claims, 9 Drawing Figures

U.S. Patent    Jul. 7, 1987    4,679,217
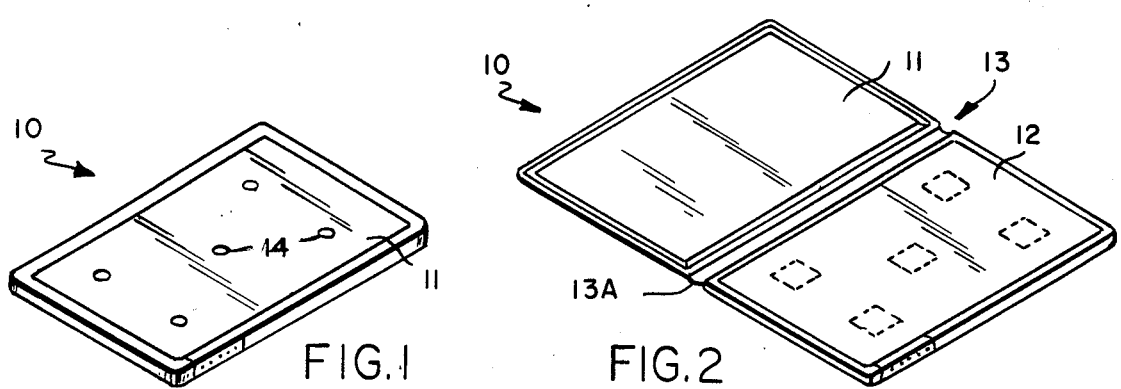
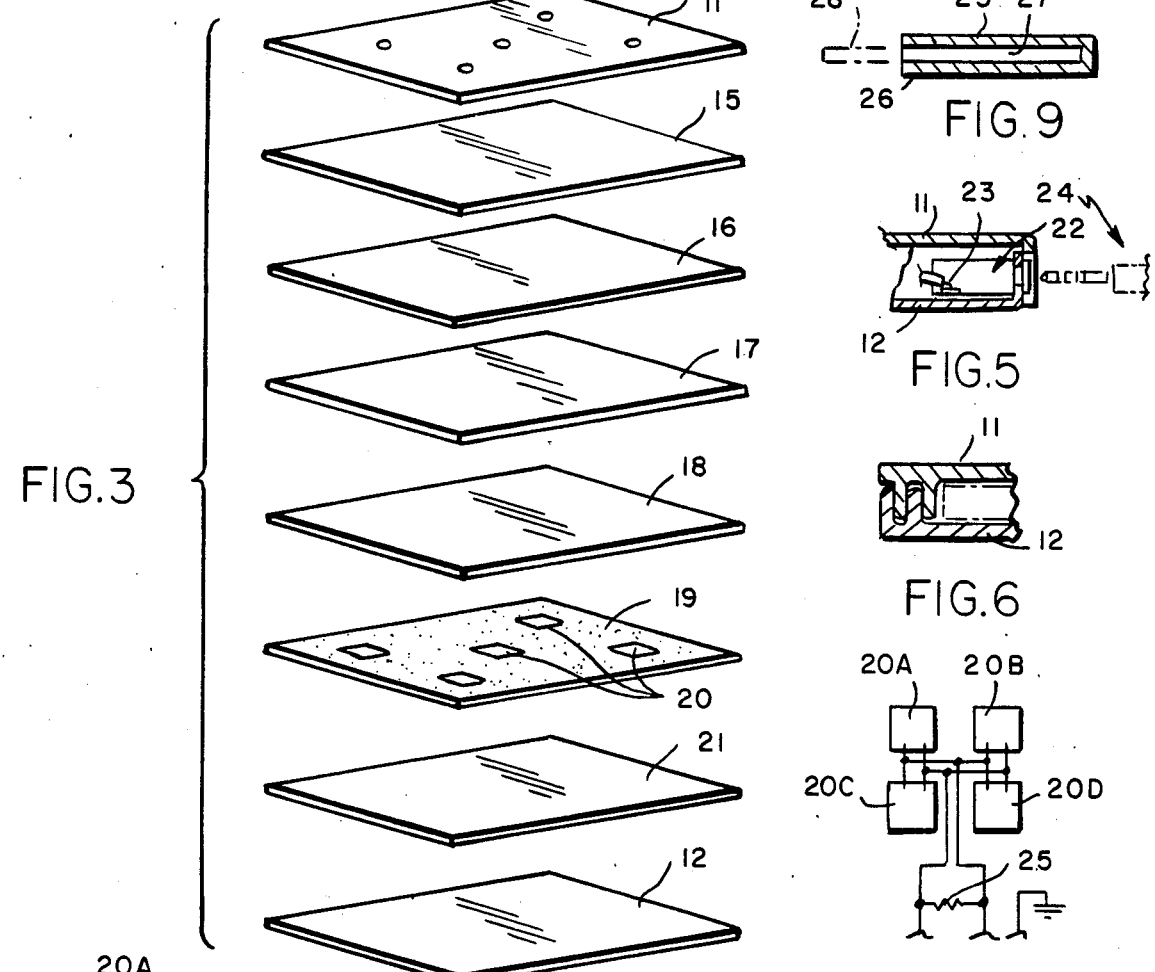
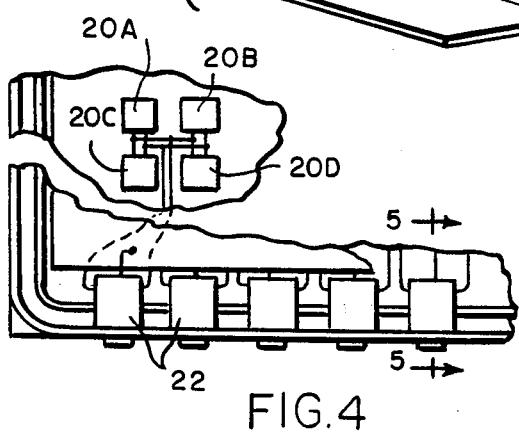
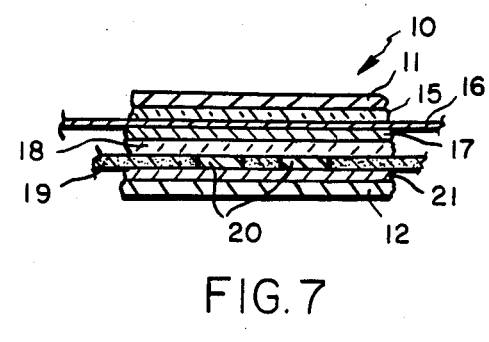

X-RAY CASSETTE STRUCTURE

INTRODUCTION

This invention relates generally to radiation systems, such as X-ray systems, and, more particularly, to image producing structures, such as X-ray film cassettes, for recording an image of an object, or a selected region thereof, exposed to such radiation and for detecting the level of such exposure so as to provide an output signal which can be used to determine the amount of radiation exposure.

BACKGROUND OF THE INVENTION

In using radiation systems, such as X-ray equipment, as in medical or other contexts, it is desirable to provide systems which can effectively control the amount of X-ray exposure to which an object is subjected, particularly where such equipment is to be used with objects such as human or animal patients. In order to control such exposure, an appropriate determination of the radiation to which the object has been exposed is required and various means can be used for automatically shutting off the equipment when the total exposure reaches a preselected level.

In such systems, suitable X-ray film and one or more phosphorous scintillating sheets (sometimes referred to as intensifier screens) for converting X-rays to photons are often placed within a cassette housing so that the overall cassette package can be positioned behind an object to be X-rayed, for example, at an appropriate position of the anatomy of a patient in alignment with the portion of the anatomy at which the X-rays are to be directed. One or more suitable dectector means are then positioned adjacent to and externally to the film cassette to detect the level of X-ray radiation at such position and to provide an output signal for supply to electronic circuitry where it can be suitably integrated as a function of time so that the integrated output signal provides an integrated measurement thereof which is proportional to the amount of X-ray radiation which has been received by the patient over such integration time interval. When the integrated measurement reaches a preselected level, appropriate circuitry can be used to automatically shut off the X-ray equipment.

One approach to providing such detection operation is to utilize a structure which is separate from and not capable of being fixedly attached to the film cassette and which includes an array of series-connected detectors (e.g., pohotovoltaic cells) individually supported on an insulator substrate. A suitable scintillator sheet, or screen, may also be mounted adjacent the detector cells for amplifying the light photon level for detection by the photovoltaic cells, for example. Such separate device can be fitted with a suitable handle so that it can be positioned adjacent the film cassette during use. An example of such an approach is shown, for example, in U.S. Pat. No. 4,053,774 issued on Oct. 11, 1977 to Berdahl.

A similar approach has been suggested in a system made and sold by Advanced Instrument Development, Inc. of Melrose Park, Illinois under the designation Mobil-AID ®. Such system uses a separate structure in the form of a "paddle" which contains an ion chamber detector placed at a selected location within the paddle structure. The location of the ion chamber field is visually indicated on the face of the paddle and measuring marks are designated along the edges thereof. The paddle is placed over the patient so that the ion chamber field designation (e.g., a circle) is aligned with the portion of the patient's anatomy of interest. The paddle is then removed from above the patient and slid under the patient in alignment with the film cassette using the previously noted measuring marks as a guide to its final positioning.

In both instances the paddle or other separate structure requires a manual alignment of the areas of interest so that the separate detector and the film cassette structures are both in line with the selected anatomical region of the patient. This procedure gives rise to errors in the correct positioning of the separate paddle or cassette devices and, moreover, each time a new film cassette is used, the alignment procedure must be repeated thereby adding to the overall time for setting up the patient for the X-ray process.

Further, if the patient moves during the X-ray process the alignment of the detectors with the film cassette can become disturbed so that the detectors are no longer detecting X-ray radiation at the proper location and in some cases may become completely misaligned with the film cassette. Since the attenuations of the X-ray radiation passing through the film cassette may vary from film cassette to film cassette, the results of the X-ray exposure detection process may also vary so that the integrated output for comparable X-ray radiation dosages will not provide uniform results unless some technique for compensating for such varying attenuations can be devised.

It is desirable that a system be devised which is capable of avoiding such problems in a manner which assures continued alignment of film and detectors during use and provides uniform results from cassette to cassette, all at reasonable cost.

BRIEF SUMMARY OF THE INVENTION

In accordance with a preferred embodiment of the invention such problems are overcome by providing an effectively integral structure which in a preferred embodiment includes one or more scintillating sheets (intensifier screens), an X-ray film, and one or more detectors or detector arrays, positioned within a single structure, such as a cassette type structure. In a preferred embodiment one or more detector arrays are positioned at preselected regions within the cassette structure so that the same cassette can be used to provide X-ray exposure output readings at one or more selected locations of the patient's body.

Further, the incorporation of the detectors within the same cassette structure as the X-ray film automatically assures that such detectors remain aligned with the film at the desired region of the patient's anatomy where the film exposure is to take place. There is no requirement for manually attempting to position an external paddle or separate cassette means for such purpose or for re-aligning the film and detectors if the patient moves, for example, during use.

Moreover, in a preferred embodiment the detector arrays can be in the form of multiple detectors connected in parallel to provide an average output signal therefrom and the value of an output resistance can be selected so that the output impedances of a large number of different cassettes can be made substantially equal so as to provide uniform results from cassette to cassette without any requirement for further compensation techniques.

DESCRIPTION OF THE INVENTION

The invention can be described in more detail with the help of the accompanying drawings wherein FIG. 1 shows a perspective view of a particular embodiment of a cassette structure of the invention in its closed state;

FIG. 2 shows a perspective view of the cassette of FIG. 1 in an open state;

FIG. 3 shows an exploded, perspective view of the components of the cassette of FIGS. 1 and 2 arranged in accordance with a particular embodiment of the invention;

FIG. 4 shows a diagrammatic view of a portion of the cassette of FIG. 1 depicting an array of detectors and electrical connections therefor;

FIG. 5 shows a view in section of a portion of the cassette of FIGS. 1 and 2;

FIG. 6 shows a view in section of another portion of the cassette of FIGS. 1 and 2;

FIG. 7 shows a view in section of the various components of the cassette of FIG. 1 in its closed form;

FIG. 8 shows a diagrammatic view of electrical connections of an array of detectors in accordance with a particular embodiment of the invention; and FIG. 9 shows a view in section of an alternative embodiment of a cassette housing structure in accordance with the invention.

As can be seen in FIG. 1, one embodiment of the invention comprises a cassette structure 10 having a housing comprising a front cover 11 and a rear cover 12 both of which may be metal but which in some cases may be non-metallic. The covers 11 and 12 can be mechanically connected by a suitable hinge structure 13 which permits the cassette to be opened and closed as desired. For example, the hinge may utilize a plastic membrane 13A appropriately attached to selected opposite edges of each of the covers 11 and 12. Any suitable latching mechanism (not shown) can be used to latch the covers in the closed position. The front cover has one or more position markings 14 on the surface thereof, as shown, which correspond to the positions of detector arrays within the cassette as discussed more fully below. X-rays which have passed through the anatomy of a patient enter the cassette through the front cover 11 for impingement on the components thereof, as discussed below. The specific embodiment of FIG. 1 shows five selected regions designated by markings 14, although any other configuration or number of markings (and, hence, detector arrays) may be used in a particular application.

The components which make up the overall cassette structure 10 in the embodiment depicted are shown in exploded form in FIG. 3 wherein the top element is the metal front cover 11 and the bottom element is the metal back cover 12. A scintillating sheet 15 is positioned below front cover 11 and converts X-rays impinging thereon into photons, as is well known in the art. Such scintillating sheet, or intensifier screen, may be of the type, for example, made and sold under the model designation MR-800 by Agfa Gevert of Piscataway, N.J. A suitable image producing element, or image receptor, such as an X-ray film 16 is positioned below intensifier screen 15 and responds to the photons to produce an X-ray image of the desired portion of the anatomy thereon, as is also well known to those in the art.

A further scintillating sheet 17 of the same type as screen 15 may also be placed on the opposite side of film 16, if desired, to further increase the intensity of the image. Sheets 15 and 17 are phosphorous compositions of the type identified above which provide good image resolution on film 16. An additional intensifier screen 18 may also be positioned below screen 17 as shown, screen 18 being substantially of the same type as screens 15 and 17.

Below intensifier screen 18 is a layer or substrate 19 of flexible material, such as a rubber-like material, e.g., sponge rubber, for example, which has imbedded therein a plurality of photovoltaic detectors. The detectors may be in the form of arrays of individual detector elements or cells, an array being placed at each of a plurality of selected regions 20. For example, as shown in FIG. 8, each regions 20 may be comprised of four photovoltaic cells 20A, 20B, 20C and 20D.

The detector arrays 20 in layer 19 are aligned with the markings 14 on front cover 11, as shown in phantom, for example, in FIG. 2. Thus, when the overall cassette structure 10 is placed adjacent a patient's body it can be appropriately positioned so that one or more of the detector regions are at one or more desired locations with respect to the patient's anatomy. Because the film and detector regions are fixedly aligned relative to one another within the housing, even when the patient moves such alignment is not disturbed and the desired X-ray level at such locations is detected correctly.

A lead backing layer 21 is positioned between detector layer 19 and back cover 12.

As can be seen in FIGS. 4 and 8, the output signals from detector cells 20A-20D, which may be of any suitable type, such as photovoltaic cells well known to the art, are electrically connected in parallel to provide the desired output signal across output resistance 25. The parallel connection effectively provides an average of the output signals of the cells over the region 20. The averaged output signal from a region 20 is then supplied to an output receptacle 22 via a suitable cabling 23 (FIG. 5) into which an output plug 24 can be inserted to provide the output signal to appropriate circuitry for performing the desired integration thereof and effective monitoring of the X-ray level at such region.

The value of output resistance 25 can be selected to provide a desired predetermined output impedance so that a plurality of cassettes can be arranged to have substantially the same output impedance so as to assure uniformity of output operation from cassette to cassette.

The edges of the front and back covers 11 and 12 are generally fabricated in a suitable interlocking fashion as by utilizing U-shaped toothed-projections and channels as shown in FIGS. 4 and 6, to provide light tightness, as is well known in film cassettes of the art.

The jack, or plug, 24 in the particular embodiment shown can be utilized to monitor the output of any one of the five detector arrays 20 depicted, although any number of detector arrays may be utilized in a cassette for any particular application.

The film/detector cassette 10 of the invention can be used by an X-ray apparatus operator more effectively than when the operator is forced to use a conventional film cassette and a separate detector device. No adjustment or re-alignment is required each time a different separate cassette is used. The alignment is automatic because of the integral structure thereof and such factor reduces the time needed for an operator to set up an apparatus for one or more X-ray applications.

The specific embodiment of the invention depicted in FIGS. 1-8 represents only one exemplary and preferred embodiment thereof and modifications thereto may occur to those in the art within the spirit and scope of the invention. Thus, in some applications, the use of screen 17 and/or screen 18 may not be necessary to provide the image amplification required. In still further applications, a suitable image producing element other than the screen 15/film 16 combination may be used to produce the desired image for detection by detectors 20. The detectors may be of other types than photovoltaic cells and any suitable elements for detecting X-ray and light radiation can be used. Moreover, as mentioned above, the number of detector arrays in any particular cassette structure, as well as the sizes thereof, may vary depending on the application in which the cassette is used. Further, while a hinged cassette structure is discussed above, the cassette alternatively may comprise a housing structure in which the front and back covers are integrally, rather than hingedly, formed to provide a relatively rigid structure. A typical such structure as diagrammatically shown in FIG. 9 utilizes integrally formed front and rear covers 25 and 26 and a suitable slotted opening 27 for slidable insertion and withdrawl of a film pack 28 into and out from the housing.

Since it is desired to maintain the detectors in correct alignment with the image producing means, the fixed positioning of the detector arrays within the housing as discussed above is preferable. Alternatively, in some applications the detector arrays may be arranged to be fixedly positioned with respect to the housing, as by being fixedly attached to the outer side of the back cover of the structure, for example, in an effectively permanent manner, or at least in a manner such that they cannot be readily removed or dislodged and, hence, remain in correct alignment, particularly during use.

Hence, the invention is not to be construed as limited to the particular embodiments disclosed except as defined by the appended claims.

What is claimed is:

1. A cassette structure capable of being positioned behind at least one selected region of an object and used for determining the radiation received by the selected region of said object, said structure comprising
a single housing means including a front and rear cover, radiation which is directed at the selected region of said object being received at said front cover when said structure is positioned behind the selected region;
image producing means positioned within said housing means and responsive to said radiation for producing an image of the selected region of said object;
photovoltaic detection means fixedly positioned, within said housing means in fixed alignment with said image producing means and responsive substantially only to the image produced by such image producing means for providing an output signal the value of which can be used to determine the radiation received at the selected region of said object.

2. A cassette structure in accordance with claim 1 wherein said image producing means is fixedly positioned within said housing between said detection means and said front cover.

3. A cassette structure in accordance with claim 2 wherein said radiation is X-ray radiation and said image producing means is an X-ray responsive film means on which an image can be produced.

4. A cassette structure in accordance with claim 3 wherein said X-ray responsive film means includes at least one scintillating screen element for converting X-ray radiation into light photons positioned within said housing adjacent a film element responsive to light photons for producing an image thereon.

5. A cassette structure in accordance with claim 4 wherein said front and rear covers are integrally formed as to provide said housing means, said housing means further having a slotted opening between said covers, said film element being capable of insertion into or withdrawl from said housing means by way of said slotted opening so that, when inserted, said film element is positioned within said housing means in alignment with said detection means.

6. A cassette structure in accordance with claim 4 wherein said front and rear covers are hingedly connected for permitting said housing means to be opened and closed so that, when open, said film element can be placed within or removed from said housing means.

7. A cassette structure in accordance with claim 4 wherein a first scintillating screen element is positioned adjacent one side of said film element between said film element and said front cover and a second scintillating screen element is positioned adjacent the other side of said film element.

8. A cassette structure in accordance with claim 7 and further including an additional scintillating screen element positioned adjacent said detection means, said first, second, and additional scintillating screen elements being of substantially the same type.

9. A cassette structure in accordance with claim 2 wherein said object is a person and said structure is capable of being positioned behind at least one selected portion of the anatomy of said person.

10. A cassette structure in accordance with claim 9 and further wherein said front and rear covers can be placed in an open or a closed position, said structure including means for interlocking said front and rear covers when said covers are in said closed position.

11. A cassette structure in accordance with claim 2 wherein said detection means comprises a plurality of detector element arrays responsive to the image produced by said image producing means each of said arrays positioned at a corresponding one of a plurality of selected regions for providing an output signal which can be used to determine the radiation received at each of said plurality of selected regions.

12. A cassette structure in accordance with claim 11 wherein each of said detector element arrays includes a plurality of detector elements connected in parallel, the parallel outputs therefrom providing an averaged output signal from said detector elements.

13. A structure in accordance with claim 2 wherein said detection means includes one or more detector elements imbedded in a substrate within said housing means.

14. A structure in accordance with claim 13 wherein said substrate is a flexible material.

15. A structure in accordance with claim 14 wherein said flexible material is a rubber-like material.

16. A structure in accordance with claim 2 and further including a lead backing element positioned within said housing adjacent the rear cover thereof.

17. A cassette structure in accordance with claim 1 and further including impedance means connected to said detection means, the value of said impedance means being selected to assure that the output impedance of said detection means has a predetermined value.

18. A cassette structure in accordance with claim 17 wherein said impedance means is connected in parallel with a plurality of parallel connected photovoltaic detector elements.

19. A cassette structure in accordance with claim 18 wherein said impedance means is a resistance means.

20. A structure in accordance with claim 17 wherein said impedance means is a resistance means.

* * * * *